US009365910B2

(12) United States Patent
Van Bennekom et al.

(10) Patent No.: US 9,365,910 B2
(45) Date of Patent: Jun. 14, 2016

(54) METHOD FOR RECOVERING HARD MATERIAL PARTICLES

(75) Inventors: André Van Bennekom, Wilnsdorf (DE); Frank Niesius, Fröndenberg (DE); Matthias Kozariszczuk, Düsseldorf (DE)

(73) Assignee: Deutsche Edelstahlwerke GmbH, Witten (DE)

( * ) Notice: Subject to any disclaimer, the term of this patent is extended or adjusted under 35 U.S.C. 154(b) by 172 days.

(21) Appl. No.: 14/000,269

(22) PCT Filed: Feb. 24, 2012

(86) PCT No.: PCT/EP2012/053179
§ 371 (c)(1),
(2), (4) Date: Nov. 4, 2013

(87) PCT Pub. No.: WO2012/113917
PCT Pub. Date: Aug. 30, 2012

(65) Prior Publication Data
US 2014/0047951 A1 Feb. 20, 2014

(30) Foreign Application Priority Data

Feb. 25, 2011 (DE) .................... 10 2011 000 955

(51) Int. Cl.
*C22B 3/06* (2006.01)
*C01B 31/30* (2006.01)
*C22B 7/00* (2006.01)
*C25C 1/00* (2006.01)

(52) U.S. Cl.
CPC ............... *C22B 7/006* (2013.01); *C01B 31/303* (2013.01); *C22B 3/06* (2013.01); *C22B 7/007* (2013.01); *C25C 1/00* (2013.01); *Y02P 10/234* (2015.11)

(58) Field of Classification Search
CPC .......... C22B 3/06; C22B 7/007; C01B 31/303
See application file for complete search history.

(56) References Cited

U.S. PATENT DOCUMENTS

| | | | |
|---|---|---|---|
| 3,438,730 A | | 4/1969 | Shwayder |
| 4,348,231 A | * | 9/1982 | Ritsko et al. ............ 419/15 |
| 4,432,950 A | * | 2/1984 | Vanderpool et al. .......... 423/61 |
| 4,470,956 A | * | 9/1984 | Cheney et al. ............ 423/53 |
| 5,384,016 A | * | 1/1995 | Lin et al. ............ 205/478 |
| 2012/0152064 A1 | * | 6/2012 | Ladi et al. ............ 75/743 |

FOREIGN PATENT DOCUMENTS

| | | |
|---|---|---|
| DE | 19711764 B4 | 11/2005 |
| JP | H06065656 A | 3/1994 |
| JP | 2007254800 A | 10/2007 |
| JP | 2011021219 A | 2/2011 |
| JP | 2011179039 A * | 9/2011 |
| WO | WO 9907905 A1 * | 2/1999 ............ C22B 34/36 |

OTHER PUBLICATIONS

Kawasaki, Hajime et al. JP 2011179039 A published Sep. 2011. Machine translation of the description.*
C. Edtmaier, et al., "Selective Removal of the Cobalt Binder in WC/Co Based Hard Metal Scraps by Acetic Acid Leaching", Hydrometallurgy, vol. 76, Edition 1-2, Jan. 2005, pp. 63-71.
S. Gurmen, et al. "Recovery of Cobalt Powder and Tungsten Carbide from Cemented Carbide Scrap Part II: Recovery of Submicron Cobalt Powder from the Leach Solution", World of Metallurgy—Erzmetall, GMBD, Bd. 57, Nr. 6, pp. 341-346 (Nov. 1, 2004).
S. Gurmen, et al. "Recovery of Cobalt Powder and Tungsten Carbide from Cemented Carbide Scrap Part I: Kinetics of Cobalt Acid Leaching", World of Metallurgy—Erzmetall, GMBD, Bd. 57, Nr. 3, pp. 143-147 (May 1, 2004).

* cited by examiner

*Primary Examiner* — George Wyszomierski
*Assistant Examiner* — Tima M McGuthry Banks
(74) *Attorney, Agent, or Firm* — The Webb Law Firm

(57) ABSTRACT

A process for recovering hard material particles which are present in a residue quantity, which is in a free-flowing or pourable form, of a hard metal which has a matrix consisting of a steel, nickel or a nickel alloy, in which the hard material particles are embedded, comprising the following production steps: pouring the residue quantity into an acid bath which contains a strong acid having a $pK_a$ value measured at room temperature of <4, adding an oxidant to the acid bath, wherein by adding the oxidant or the acid a redox potential of the acid bath is set which is within a desired range of 300-800 mV, dissolving the matrix of the residue quantity, and depositing of the hard material particles contained in the acid bath after dissolving the matrix.

15 Claims, No Drawings

METHOD FOR RECOVERING HARD MATERIAL PARTICLES

CROSS-REFERENCE TO RELATED APPLICATIONS

This application is the United States national phase of International Application No. PCT/EP2012/053179 filed Feb. 24, 2012, and claims priority to German Patent Application No. 10 2011 000 955.8 filed Feb. 25, 2011, the disclosures of which are hereby incorporated in their entirety by reference.

BACKGROUND OF THE INVENTION

1. Field of the Invention

The invention relates to a process for recovering hard material particles which are present in a residue quantity, which is in a free-flowing or pourable form, of a hard metal which has a matrix consisting of a steel, of nickel or a of a nickel alloy, in which the hard material particles are embedded.

2. Description of Related Art

Hard metal materials of the type mentioned above are nowadays usually produced by powder metallurgy, melting metallurgy or spray compacting processes. Metal materials which have a lower melting point than the hard materials which are to be embedded in them in each case are normally used for the metal matrix.

Compositions of intermetallic phases, often metal carbides but also ceramic particles, are used as hard materials, which are typically based on a metallic bond. The hard materials used in practice correspondingly include, for example, carbides, such as TiC, WC, WC—W2C, NbC, SiC, B4C, Al4C3 or $VC_2$, nitrides, such as AlN or TiN, borides, such as TiB2 or MgB2, and carbonitrides, such as $Ti(C_2N)$ or V(C,N).

Amongst other things, residues in the form of chips, residual pieces or defective pieces are formed, when machining hard metal materials of the previously mentioned type, which can be recycled. Returns, such as components which in practical use have become unfit due to wear and tear or a fault, also come under these recyclable residues. All these residues contain a high proportion of the respective hard material. Since manufacture normally requires a high input of energy and outlay of equipment, and hence the hard materials themselves represent a high value, from the point of view of saving resources and economy there is a requirement for the hard materials in question to be able to be recovered in a simple and cost-effective way.

DE 197 11 764 B4 describes various possibilities for recycling hard metal materials, in which hard material particles are bound in an aluminium matrix. All these possibilities are based on the concept of melting down the respective residues and subjecting them to treatment with an additive, such as a gas or a salt, or to a mechanical treatment, such as a separation by sedimentation, the effect of centrifugal forces or a cooled roller, which removes the molten metal from the melt bath, in order to separate the metal of the matrix material from the hard material particles.

In addition to the recycling processes based on melting the metal matrix of the hard metal, it is also known for example from the article "Selective removal of the cobalt binder in WC/Co based hard metal scraps by acetic acid leaching" by C. Edtmaier et al., Hydrometallurgy, Volume 76, Edition 1-2, January 2005, pages 63-71 that the cobalt proportion can be extracted from a tungsten carbide/cobalt hard metal material by means of acetic acid and oxygen added to the acid bath. Here, the WC particles bound in the cobalt remain as insoluble solid material.

One hard metal material, produced powder-metallurgically in the form of a metal-matrix composite ("MMC") and successfully used in practice under the trademark "Ferro-Titanite", contains up to 45% vol. titanium carbide (TiC) with a hardness of 3200 HV. With this material, the titanium carbide is embedded into a matrix consisting of steel, the properties of which are adapted to the respective intended use. Thus, ferro-titanite materials are available, as specified in detail in the "Ferro-Titanite® August 2003 collection of data sheets, in which the steel matrix is produced from a martensitic steel with very good tempering properties, from a highly corrosion-resistant steel, from an age-hardenable nickel-martensite steel with a high degree of toughness or from a non-magnetisable, highly corrosion-resistant steel with very good tempering properties. The contents of the particulate TiC hard material grains in the materials in question are in practice typically in the range of 30-35% wt.

SUMMARY OF THE INVENTION

Taking the prior art explained above as the starting point, the object of the invention consisted in specifying a process which could be implemented cost-effectively, by means of which it is possible to recover high-grade hard material particles in an economically effective way at optimised recovery rates from residues which consist of a hard metal having a matrix and hard materials embedded in it.

DESCRIPTION OF THE INVENTION

The process according to the invention for recovering hard material particles which are present in a residue quantity, which is in a free-flowing or pourable form, of a hard metal which has a matrix consisting of a steel, of nickel or of a nickel alloy, in which the hard material particles are embedded, comprises the following production steps:

pouring the residue quantity into an acid bath which contains a strong acid having a $pK_a$ value measured at room temperature of <4, adding an oxidant to the acid bath, wherein by adding the oxidant or the acid a redox potential of the acid bath is set which is within a desired range of 300-800 mV, dissolving the matrix of the residue quantity, deposition of the hard material particles contained in the acid bath after dissolving the matrix.

Thus, according to the invention the alloying elements of the steel of the matrix of the residues are brought into solution in an acid bath, so that after the process according to the invention has ended the insoluble hard materials in the hard material residual quantity to be treated are present as individually separable, pourable particles.

For this purpose, according to the invention an acid bath is provided, which is constituted for an acid attack which is sufficient to achieve the aim of dissolving the steel and into which the residual quantity of hard materials to be treated is poured.

According to the invention, the acid bath contains a strong acid with a $pK_a$ value measured at room temperature which is below 4. The $pK_a$ value of an acid ("acid exponent") is defined as the negative, decade logarithm of the acid constant according to the Römpp-Kompaktlexikon Basislexikon Chemie, 1999, page 1944. $HClO_4$, HI, HCl, $H_2SO_4$, $H_3O^+$, $HNO_3$, $HSO_4$, $H_3PO_4$, $[Fe(H_2O)_6]^{3+}$, $HF$, $HNO_2$, $HCOOH$ are, for example, acids with a $pK_a$ value below 4.

At a suitable time before, after or while pouring in the residual quantity in question, an oxidant is added to the acid bath, in order to set a certain redox potential for the acid bath which is optimal for dissolving the matrix.

According to the invention, the redox potential of the acid bath is set such that it is in a desired range of 300-800 mV.

Practical tests have shown that by adhering to these controlled conditions at least 90% of the hard materials contained in the residue quantity can be recovered. Optimum results are produced if the redox potential is kept within the desired range of 400-700 mV, in particular 400-600 mV. Here, it has become apparent that the high recovery rates obtained by the procedure according to the invention can be particularly reliably achieved if the redox potential is kept within a desired range of 450-500 mV.

In order to bring the steel or the nickel or nickel alloy of the matrix of the hard metal residue into solution within a period of time which is suitable for economic use, according to the knowledge forming the basis of the invention a highly active acid system must be used. Such an acid system is available with the acid bath used according to the invention and with the additionally added oxidant adhering to the predefined range for the redox potential.

With the process according to the invention, recovery rates of 90% and more can be obtained using comparably weak and cost-effective acids, like for example hydrochloric acid, under moderate reaction conditions with regard to operational requirements, energy consumption and environmental pollution.

Surprisingly, it has emerged that the high recovery rates sought can even be obtained with comparably low acid concentrations. Hence, the acid concentration according to a practice-oriented embodiment of the invention is in a range of 1 to 30% vol., preferably 1 to 20% vol. in relation to the total liquid volume of the acid bath. Equally surprisingly, it has become apparent that it is sufficient if the oxidant is kept in a final concentration of 0.1 to 5% vol., in particular 0.1 to 2% vol., in each case in relation to the total liquid volume of the acid bath.

If the acid content of the acid bath should fall below a desired value over the course of the treatment time, acid is added to the acid bath again. Equally, more oxidant can be added to the acid bath over the course of the treatment, in order to keep the redox potential within the optimum range.

When hard material particles are mentioned here, then what are meant are all bodies present in grain or powder form which can be separated from one another and the grain size of which falls within a specific range. Typically, these hard materials when used in a hard metal material have a grain diameter which is in the range of up to 30 µm, in particular 5-20 µm. The hard material particles separated from the matrix in the course of the recycling process according to the invention typically have a considerably finer grain with an average diameter of 1-5 µm. As such, they are optimally suitable for recycling for producing new hard metal materials.

The technical facilities required for carrying out the process according to the invention and for treating the acid which is thereby present are fundamentally known, for example from the field of chemical or electrochemical surface treatment (pickling) of steel flat products, and have been proven in commercial use.

Sulphuric acid, nitric acid or hydrochloric acid are, for example, eligible acids for the acid bath. Using hydrochloric acid to dissolve the metal matrix surrounding the respective hard material particles is particularly advantageous here because hydrochloric acid has advantages in terms of economy, the environment and industrial safety. Furthermore, hydrochloric acid in comparison to other acids acts aggressively in an optimum way on the steel or nickel material to be dissolved of the matrix of the residue which is to be recycled in each case. Thus, all alloying constituents of the respective steel material can also be brought into solution with the acid of the acid bath. This particularly applies if the matrix material is a base, corrosion-sensitive steel material which is intended for applications which are not exposed to aggressive acid-like media.

As already mentioned, the invention can for example be cost-effectively put into practice by using hydrochloric acid for the acid bath. Here, the final concentration of the hydrochloric acid in the acid bath is practically kept in the range of 50 to 300 g/L, preferably 100 to 250 g/L, in each case in relation to the total liquid volume of the acid bath. Particularly good results are produced if the final concentration of the hydrochloric acid in the acid bath is between 1 and 30% vol., preferably between 5 and 20% vol. and in particular between 5 and 15% vol. in relation to the total liquid volume of the acid bath.

By adding a suitable oxidant, the redox potential of the acid bath can be set in such a way that dissolution of the matrix metal by the acid proceeds in a controlled manner. Setting the redox potential according to the invention enables particularly high recovery rates between 90 and 100% to be obtained even with treatment times of just a few hours. Hence, practical tests have shown that treatment times of less than twelve hours are consistently adequate. Here, optimum treatment times are produced if by adding the oxidant a redox potential of the acid bath is set which is in a desired range of 300-800 mV. Optimum results are then produced if the redox potential is kept in the desired range of 400-700 mV, in particular 400-500 mV. In order to ensure that the effectiveness of the acid bath is kept at a uniformly high level over the course of the process according to the invention, the redox potential can be monitored and if it departs from the desired range it can be brought back into the desired range by a fresh addition of oxidant (increase) or acid (reduction).

Optimum results are produced if hydrogen peroxide ($H_2O_2$) is used as the oxidant. Here, the final concentration of the hydrogen peroxide ($H_2O_2$) is kept in the range of at most 0.1 to 5% vol., preferably 0.1 to 2% vol., in each case in relation to the total liquid volume of the acid bath. This proves to be particularly advantageous if the acid in the acid bath is hydrochloric acid (HCl). In a practical trial, recovery rates of more than 90% could be reliably obtained when the acid bath contained less than 2% vol. hydrogen peroxide, between 5 and 20% vol. hydrochloric acid, in each case in relation to the total liquid volume of the acid bath, and the redox potential was in the process kept within a desired range of 300 to 800 mV, preferably 300-650 mV and in particular 450 to 500 mV.

A further acceleration in the dissolution of the matrix of the hard metal residue quantity carried out according to the invention can be achieved by heating the acid bath to a temperature above room temperature. Practical tests have shown, in this regard, that optimum processing times ensue if the temperature of the acid bath is kept in the range of 25-70° C., in particular 25-60° C. When the temperature in the acid bath is in the region of 60° C., in combination with the addition of an oxidant which is pre-specified according to the invention, a dissolving rate results which also makes the process according to the invention commercially usable. The temperature can be directly controlled by adding oxidant. Hence, it can be advantageous to monitor the temperature course of the acid bath and then apportion more oxidant in each case when the temperature of the acid bath falls below a predefined desired value. In practice, this can for example be 55° C. As a result of the addition of hydrogen peroxide, which is carried out to support the conversion of $FE^{2+}$ to $Fe^{3+}$, and the exothermic reaction accompanying it, with corresponding sizing separate heating of the acid bath can be dispensed with. The $Fe^{3+}$ concentration can in the process be monitored by detecting the redox potential of the acid bath.

Stirring the acid bath at least occasionally during the dissolving process can also contribute to accelerating the dissolution of the matrix of the hard metal residues aimed for according to the invention.

Carrying out an electrolytic separation in addition to dissolving the matrix in the acid bath can equally contribute to reducing the time required for dissolving the matrix.

The progress of the dissolution of the matrix of hard metal residue treated according to the invention can be monitored by from time to time checking the proportion of the magnetisable particles still contained in the acid bath. When the proportion of magnetisable particles falls below a desired value, the process can be terminated.

The subsequent deposition of the hard material particles precipitating out of the dissolved matrix can take place in a simple way by carrying out the deposition of the hard material particles as sedimentation in the still acid bath.

Of course, other deposition processes are also possible, such as filtering or mechanically assisted separation of the acid from the particles.

After the volume of acid has been separated to an at least predominant extent from the hard material particles obtained, the deposited hard material particles should be rinsed with a neutral rinsing agent, in order to free them from the adherent acid and set a pH value which is acceptable for further processing.

A significant advantage of the procedure according to the invention with the recovery of hard materials contained in hard metal residues consists in the fact that the elements of the matrix dissolved in the acid bath can also be fully recovered again to the greatest possible extent in a way which is inherently known in the pickling treatment of steel flat products. Depending on the type of acid used and the composition of the acid bath, the matrix of the hard metal residues can also be dissolved in such a way that certain constituents of the steel, such as for example Mn, are not dissolved in the acid but remain as particles which are solid pieces and which can subsequently also be conveyed for further processing.

The process according to the invention is particularly suitable for treating TiC hard metal materials, in which titanium carbide is in each case bound in a matrix. The steel of the matrix can have the most diverse compositions, in order to ensure that the hard metal has properties which are optimally adapted to the respective use.

The invention is explained in more detail below on the basis of exemplary embodiments.

A residue quantity consisting of chips of a TiC hard metal material was processed within the framework of a laboratory test. The TiC hard metal material had 33% wt. of TiC particles in a magnetisable steel matrix which in addition to iron and unavoidable impurities contained (in % wt.) 0.65% C, 3% Mo and 3% Cr.

The residue quantity was mixed in a ratio of 10:1 with a hydrochloric acid bath, the hydrochloric acid concentration of which was 180 g/L.

Subsequently, 20% hydrogen peroxide was added to the acid bath, in order to set the redox potential of the acid bath to a value which is between 400 mV and 450 mV. This redox potential was maintained during the entire process. More hydrogen peroxide was apportioned when the redox potential fell below a desired value of 410 mV.

During the reaction process, the acid bath and the residue quantity were continually stirred, in order to compensate concentration and temperature differences and, as a consequence thereof, shorten the dissolving time.

A first check of the proportion of the residue quantity still remaining up to that point took place after a reaction time of 4 hours with the aid of a bar magnet, on which chips of the residue quantity still present in the HCl acid bath have collected. This measurement was repeated until, after a treatment time of in total about 6 hours, no more chips in a sample taken appeared on the bar magnet.

This was judged to be a sign that at least the iron of the steel of the steel matrix had been fully brought into solution with the acid of the acid bath.

During the reaction time, gas bubbles formed which were unstable and were destroyed by the stirring effect.

After the steel matrix of the hard material residual quantity had been fully dissolved, sedimentation of the remaining titanium carbide took place over 75 minutes. A first sample was taken after 20 minutes and it became apparent that although enough TiC had already settled out to give an economic yield, an optimum yield could be obtained with a sedimentation time of 60 minutes. Correspondingly, a practice-oriented embodiment of the invention makes provision for a period of 20-70 minutes, in particular 60 minutes, to be set for the sedimentation process.

For further processing, about 90% of the total volume of the liquid phase of the acid bath was drawn off over the titanium carbide and replaced by rinsing water. The titanium carbide obtained was then rinsed 4 to 6 times with tap water. In this way, a pH value of approximately 6 could be obtained.

The results of the procedure described were confirmed by two tests repeated with the same operating parameters. Within the framework of these tests, based on the TiC hard metal residue quantity used in each case, the titanium carbide originally contained in it was almost fully recovered. The iron bound in the metal matrix and further alloying elements fully dissolved in the hydrochloric acid of the acid bath used were measured.

Then, tests close to real operating conditions were carried out in a stirred tank reactor with a filling volume of approximately 600 liters. The stirred tank reactor had an outlet, via which the HCl acid bath could be drained to a remaining volume of 15% of the starting volume. A submersible pump was used to further reduce the acid bath volume in the stirred tank reactor, particularly during the rinsing processes.

Measurement of the temperature and the redox potential of the acid bath contained in the reactor as well as the checking of the proportion of the hard metal residue quantity still present in the acid bath were carried out by samples taken intermittently by means of a ladle.

Hydrogen peroxide was added as a function of the redox potential respectively detected.

The aim of the tests was to recover approximately 35 kg of titanium carbide. For this purpose, a residual quantity of 100 kg in total of TIC hard material chips was used which accumulated during the machining of blanks consisting of the TIC hard metal.

In detail, for the tests the following operating parameters were set and production steps carried out:
  With continuous stirring and with 120 liters of water already added, 200 liters of hydrochloric acid (corresponding to a concentration of 180 g HCl/L) were added into the reactor.

Four portions of 25 kg each of the residue quantity were then poured into the hydrochloric acid.

In total, about 6 liters of $H_2O_2$ was apportioned as required, in order to keep the redox potential of the acid bath in the range of 400-500 mV. On average, the redox potential was in this way at approximately 450 mV. The hydrogen peroxide was apportioned in 100 ml batches in each case.

The maximum temperature of the acid bath was set at 60° C. The acid bath did not have to be separately heated owing to the exothermic reactions taking place in the reactor. If the temperature of the acid bath fell below 55° C., more hydrogen peroxide was apportioned.

The tests were in each case conducted until no more gas bubbles were formed. Dependent on the respectively set operating conditions "acid bath temperature" and "redox potential of the acid bath", this occurred after a reaction time of 2-6 h.

The proportion of magnetisable particles still present in the acid bath was checked via sampling and use of a bar magnet. If magnetisable material was still present, more acid or $H_2O_2$ was apportioned.

After the steel matrix of the residue quantity had dissolved, sedimentation of the titanium carbide remaining as residue was carried out over a period of 30 minutes.

Then the acid bath was drained.

Subsequently, the container with the titanium carbide contained in it was rinsed with 500 liters of water, a further sedimentation was carried out and finally the rinsing water was drained. This process was repeated until a pH value of 6 was obtained for the TiC particles.

After obtaining this pH value, which is acceptable for further processing, the reactor was filled with water again and a flocculant was added while using the stirrer, so that then the TiC particles could be flushed out into a collecting vessel, in which they were subjected to a further decanting and concentration step.

Finally, the TiC particles obtained were dried and conveyed for further processing. Their grain size was on average 1-5 μm and proved to be optimum for producing hard metal materials, of which a particularly fine, uniform distribution of properties is required. In total, 33.5 kg of TiC were obtained. The recovery rate according to this was 95.7%.

The invention claimed is:

1. A process for recovering hard material particles which are present in a residue quantity, which is in a free-flowing or pourable form, of a hard metal which has a metal matrix consisting of a steel, of nickel or of a nickel alloy, in which the hard material particles are embedded, comprising the following production steps:

pouring the residue quantity into an acid bath which contains a strong acid having a $pK_a$ value measured at room temperature of <4, adding an oxidant or an acid to the acid bath, wherein by adding the oxidant or the acid a redox potential of the acid bath is set which is within a desired range of 300-800 mV, dissolving the matrix of the residue quantity, and depositing the hard material particles contained in the acid bath after dissolving the matrix.

2. The process according to claim 1, wherein the acid bath contains hydrochloric acid, sulphuric acid or nitric acid.

3. The process according to claim 1, wherein by adding the oxidant or the acid a redox potential of the acid bath is set which is within a desired range of 300-650 mV.

4. The process according to claim 1, wherein the redox potential is monitored and if it departs from the desired range it is brought back into the desired range by a fresh addition of oxidant or acid.

5. The process according to claim 1, wherein the acid bath is heated.

6. The process according to claim 5, wherein the temperature of the acid bath is kept within a range of 25-70° C.

7. The process according to claim 6, wherein the oxidant is added as long as the temperature of the acid bath is ≤55° C.

8. The process according to claim 5, wherein the temperature of the acid bath is kept at ≤60° C.

9. The process according to claim 1, wherein the oxidant used is hydrogen peroxide ($H_2O_2$).

10. The process according to claim 1, wherein at least at times the acid bath is stirred when the metal matrix is being dissolved.

11. The process according to claim 1, wherein an electrolytic separation takes place in addition to the dissolving step in the acid bath.

12. The process according to claim 1, wherein the process is terminated when a content of magnetizable material in the acid bath is below a given value.

13. The process according to claim 1, wherein the deposition of the hard material particles is carried out as sedimentation in the acid bath.

14. The process according to claim 1, wherein the deposited hard material particles are rinsed with a neutral rinsing agent.

15. The process according to claim 1, wherein the metals of the metal matrix dissolved in the acid bath are chemically or electrochemically recovered.

* * * * *